Sept. 17, 1957 H. GRIGULL 2,806,913
SOUND PRESSURE RECEIVER
Filed May 16, 1955 2 Sheets-Sheet 1

INVENTOR:
Hans Grigull
By Bryant & Lowry
ATTYS.

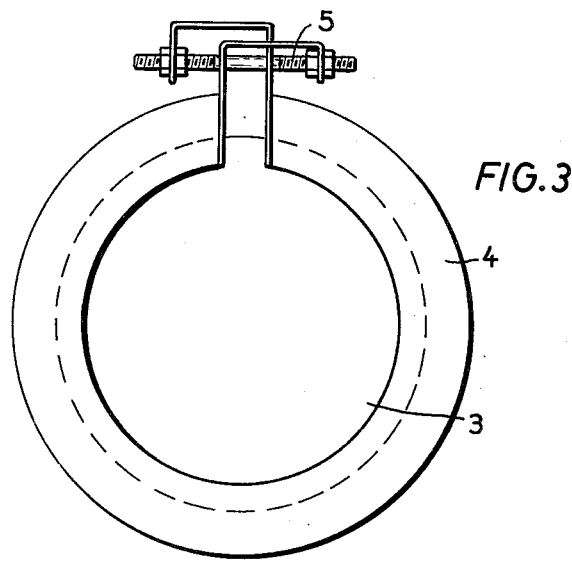
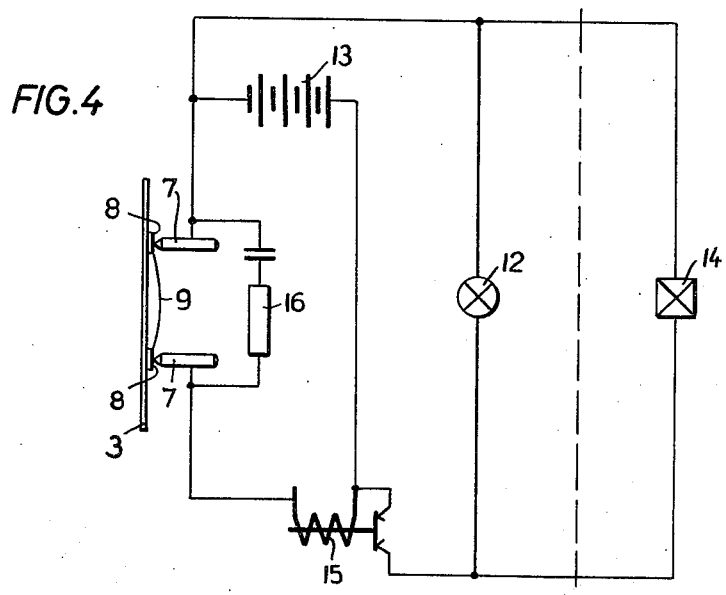

United States Patent Office 2,806,913
Patented Sept. 17, 1957

2,806,913
SOUND PRESSURE RECEIVER
Hans Grigull, Cologne, Germany
Application May 16, 1955, Serial No. 508,750
Claims priority, application Germany May 20, 1954
6 Claims. (Cl. 200—61.01)

The invention relates to a sound pressure receiver which is especially adapted for the reception of overhauling signals from a following vehicle.

The invention aims to provide a receiver of this type which responds to the sound pressure wave transmitted from the horn of the passing or overhauling vehicle and provides a positive signal, either visual or acoustic, to the driver of the vehicle being approached or passed. It may also provide a signal, visible to the rear, to indicate to the car desiring to pass that his signal has been received.

The known prior art reception systems of this type are resonance receivers which involve the drawback that the resonators used, as for example, Helmholtz resonators, have only a definite frequency band width and amplify only this width. For this reason there are transferred not only the signals to be received but also all side-tones. The sound pressure receiver according to the present invention advantageously differs from the known systems in that the screen of the diaphragm casing which is permeable to sound pressure is made secure against aerodynamic pressure shocks and—beginning with a definite frequency—merely puts into oscillation the static pressure column in the interior of the cone.

The essential feature of the invention consists in that the diaphragm is kept permanently tensioned and lying outside the battery circuit is provided with at least two contact areas or lamellas electrically connected with one another. The contact pins cooperating with the contact lamellas of the diaphragm are mounted in fixed and rigid arms. The contact pins are connected in a circuit in which is arranged a source of current, a relay and an optical or acoustic signal.

The arrangement according to the invention offers the advantage of high sensibility. The device responds very well without the transfer of side-tones. This is effected by the mounting of the contact pins and their double arrangement, while the contact lamellas are electrically connected with one another. Due to the double arrangement of the contact pins and contact lamellas, the device is set in action by very small oscillations of the diaphragm, which causes an interruption of the circuit at the places of contact of the contact pins.

To be able to keep the diaphragm of the sound pressure receiver under permanent tension, the edge of the diaphragm according to another feature of the invention is clamped in a slotted ring whose ends are connected with a spreading device.

This spreading device simultaneously serves for the compensation of temperature. If the clamping ring tends to contract or to expand due to the influence of lower or higher temperatures, the rod of the spreading device, suitably consisting of stronger reacting material, opposes the contraction or expansion in such a manner that the diameter of the clamping ring is not varied.

As it is important that the contact lamellas be arranged free of stresses upon the diaphragm, these lamellas according to a further feature of the invention are preferably applied by electroplating.

Further features and advantages of the object of the invention will be apparent from the following description.

The drawing shows by way of example one embodiment of the sound pressure receiver according to the invention.

Fig. 3 shows diagrammatically the spreading device for the diaphragm support; and Fig. 4 is a wiring diagram.

Figure 2:
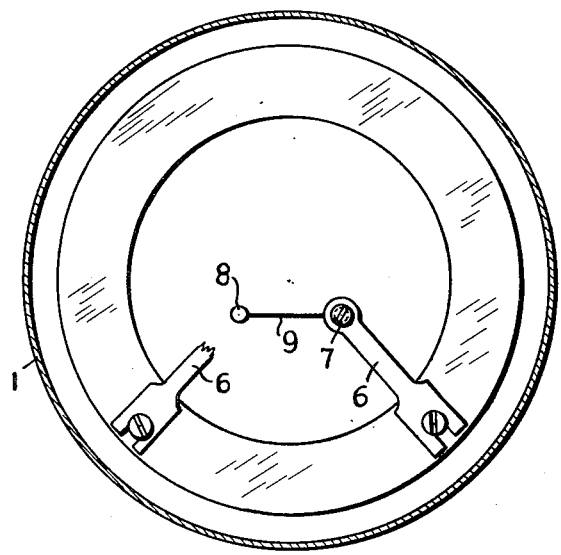
Fig. 2 is a cross-section on line II—II of Fig. 1.
Figure 1:
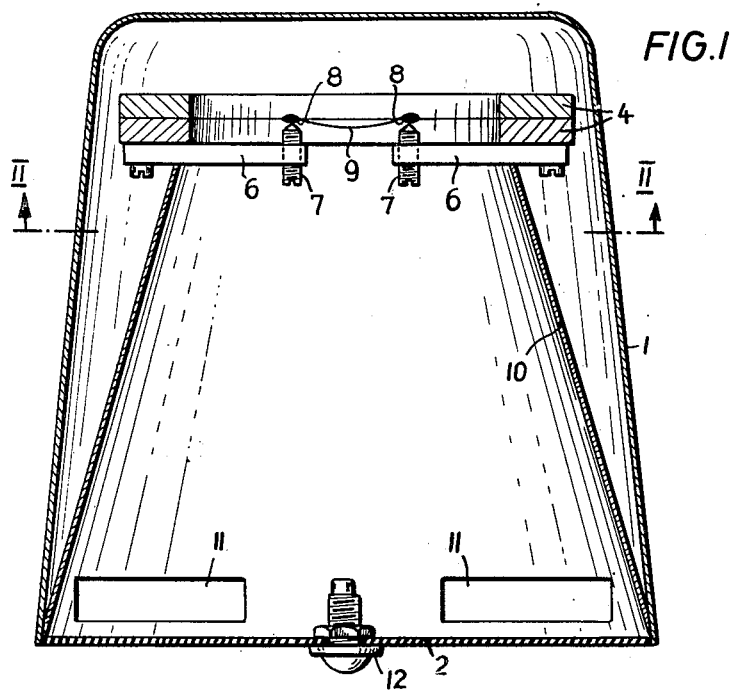
Fig. 1 is a longitudinal section of the sound pressure receiver.

The diaphragm casing 1 is closed by means of a screen 2 which is permeable only to sound waves of definite frequency. The edge of diaphragm 3 is clamped between rings 4. The rings 4 are slotted and the ends of the rings are connected with opposite ends of a spreading device 5 (Fig. 3) to spread the ring ends apart and thereby to keep the diaphragm 3 permanently tensioned as well as to allow the compensation of temperature. The rings 4 are further provided with arms 6, in the ends of which are adjustably mounted contact pins 7. The contact pins 7 cooperate with contact lamellas 8 which preferably are applied to diaphragm 3 by electroplating. The contact lamellas 8 are electrically connected by means of a wire 9. To diminish the formation of sparks at the place of contact with the contact pins 7, a high ohmic resistance 16 is preferably connected in parallel to the contact pins 7.

The screen 2 of diaphragm casing 1 is connected with the rings 4 of diaphragm 3 by means of a cone 10 provided with openings 11 to allow equalization of the pressure between the spaces in front of and behind diaphragm 3. The screen 2 further carries a signal lamp 12.

As is shown by the wiring diagram (Fig. 4), a first circuit is formed by battery 13—contact pin 7—contact lamella 8—wire 9—contact lamella 8—contact pin 7—coil of relay 15—battery 13. The high ohmic resistance 16 is connected in parallel to the contact pins 7. A second circuit is formed by battery 13—connecting contacts of relay 15—signal lamp 12—battery 13. The acoustic or optical signal 14 in the driver's cab is connected in parallel to the signal lamp 12.

The function of the device is as follows:

If the diaphragm 3 is put into oscillation by means of the sound pressure entering through screen 2 of casing 1 and over the static pressure column present in cone 10, the contact lamellas 8 of diaphragm 3 are lifted from the contact pins 7. Thereby the first circuit is interrupted, the second circuit is closed and the (acoustic or optical) signal 14 is operated. Simultaneously with signal 14 signal lamp 12 lights and announces to the driver of the following vehicle that his signal has been received. If signal lamp 12 burns out, signal 14 is nevertheless operated.

As already mentioned above, the screen 2 of casing 1 is formed as a frequency screen, the selected frequency ranges including also the ultrasonic range. This fact is important in connection with the fight against noise, as the signals may be sent with a frequency which is acoustically not preceptible by men, but which may be made visible in an optical or acoustic manner.

While it would be possible to provide a single contact area on the diaphragm, cooperating with an external contact, the present invention overcomes two major drawbacks to such an arrangement. First, by using two contacts on the diaphragm connected as by a fine wire, the diaphragm itself may be chosen of materials other than conductors, and no provision need be made for including the diaphragm in the circuit. Second, by the provision of two separate points at either of which the external circuit may be broken, the circuit is much more sensitive to slight motions of the diaphragm. Even if one contact should happen to lie at a vibrational node at a certain frequency, the probability is very great against both contacts lying at nodes.

To maintain the diaphragm properly stretched or tuned to agree with the principal acoustic or ultrasonic frequency to which it is desired to respond, it is attached to a split ring whose free ends are biased apart by a rod or bar whose thermal expansion is different from the rings and so designed that a temperature change tending to expand the ring will contract the bar, thus maintaining the mounting diameter and the diaphragm tension at a constant value.

I claim:

1. A sound pressure receiver, especially for the reception of overhauling signals from a following vehicle, comprising a pressure-responsive diaphragm, means for tensioning said diaphragm to render it sensitive to a particular frequency range of sound pressures, and at least two spaced-apart electrical contact areas on said diaphragm connected electrically with one another to form with an external circuit by contacting two electrodes therein, an electrical control switch operable upon very slight stimulation of said diaphragm.

2. The invention in accordance with claim 1, in which said tensioning means comprises a radially slotted spreading ring to which said diaphragm is fastened, and means for urging the free ends of said ring apart to spread said diaphragm.

3. The invention in accordance with claim 2, in which said urging means comprises a bar of material having a coefficient of expansion with temperature opposite to that of the material of said ring, whereby the tension of said diaphragm is maintained constant over a range of ambient temperatures.

4. The invention in accordance with claim 1, in which said contact areas are electrically plated areas upon said diaphragm.

5. The invention in accordance with claim 1, including a casing in which said receiver is mounted, having one end closed by a frequency-selective screen, and a duct connecting said screen acoustically with said diaphragm, said duct being perforated to equalize the static pressure on the two sides of the diaphragm.

6. The invention in accordance with claim 5, in which said screen is arranged to transmit sound waves of ultrasonic frequencies.

References Cited in the file of this patent

UNITED STATES PATENTS 2,161,416     Heck et al. _____ June 6, 1939